United States Patent [19]

Armier et al.

[11] Patent Number: 4,723,063
[45] Date of Patent: Feb. 2, 1988

[54] LASER WELDING APPARATUS

[75] Inventors: Karl-Heinz Armier; Bernd Ladiges, both of Hamburg, Fed. Rep. of Germany

[73] Assignee: Rofin-Sinar Laser GmbH, Hamburg, Fed. Rep. of Germany

[21] Appl. No.: 845,214

[22] Filed: Mar. 27, 1986

[30] Foreign Application Priority Data

Apr. 16, 1985 [DE] Fed. Rep. of Germany ....... 3513501

[51] Int. Cl.⁴ .............................................. B23K 26/00
[52] U.S. Cl. ........................ 219/121 LC; 219/121 FS
[58] Field of Search .................. 219/121 FS, 121 LC, 219/121 LD, 121 LH, 121 LJ, 121 LN, 121 LG

[56] References Cited

U.S. PATENT DOCUMENTS 4,027,137  5/1977  Liedtke .................. 219/121 FS X
4,324,972  4/1982  Furrer et al. ............... 219/121 FS

FOREIGN PATENT DOCUMENTS 0003913  1/1985  Japan ........................... 219/121 FS

*Primary Examiner*—C. L. Albritton
*Attorney, Agent, or Firm*—Pennie & Edmonds

[57] ABSTRACT

The laser welding apparatus has a nozzle (10) for generating a transversely extending gas current (14) between the optical system (4, 5, 6) and the beam focus for the deflection of particles moving in a direction towards the optical system (4, 5, 6). In order to reduce the level of noise development and to improve the protective action of the gas current curtain (14), the receiving aperture (12) of a gas exhaust line (13) is disposed opposite the nozzle (10), and furthermore the nozzle (10) is provided within an injector envelope (11), which forms together with the gas exhaust line (13) a substantially continuous flow channel.

6 Claims, 1 Drawing Figure

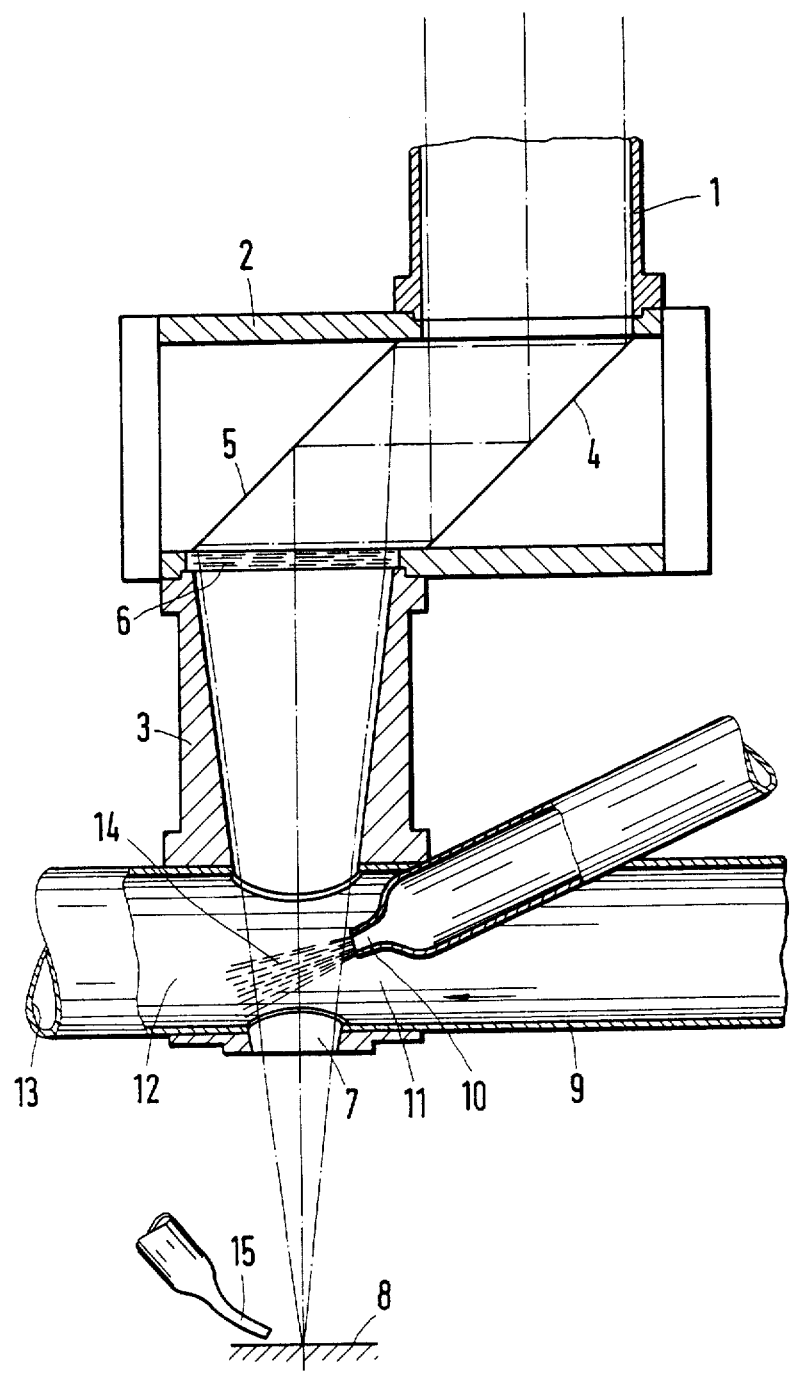

LASER WELDING APPARATUS

The invention relates to a laser welding apparatus with a nozzle for generating a transversely extending gas current between the optical system and the beam focus for the deflection of particles moving in a direction towards the optical system, in which apparatus the receiving opening of a gas exhaust line is disposed opposite the nozzle. The expression "laser welding apparatus" is intended to include apparatuses for similar application, especially for welding.

In welding, by means of a focused laser beam, there can be no prevention of a situation in which particles are thrown away from the welding position, which particles, when they reach the optical system (lens, mirror, protective disk), make the latter dirty and thus can not only reduce the power but also give rise to permanent damage to the optical system in consequence of local overheating. Naturally, this risk is the smaller, the further the optical system is situated from the welding focus; however, optical systems with a long focal length are frequently undesired, because they give a larger focal spot diameter. It is also known to form in front of the optical system a protective curtain consisting of a transversely directed gas current, which is intended to deflect particles moving in a direction towards the optical system (U.S. Pat. No. 3,626,141, British Laid-Open Specification No. 2,045,141). Quite apart from their troublesomely high degree of loudness, such arrangements have the disadvantage that the turbulences generated by them also have an effect in the welding region and give rise there to disturbances, eg. in consequence of penetration of a special atmosphere of protective gas which is present there. Accordingly, they must be disposed at the greatest possible distance from the welding focus; this leads to the application of objective lenses having undesirably long focal lengths and to a reduction in the distance between the air current curtain and the optical system. However, it is desired to maintain this distance as large as possible, because the effectiveness of the gas current curtain is the greater, the greater is its distance from the optical system. This is readily understandable, when it is taken into consideration that at a given angle of deflection, which a particle travelling towards the optical system experiences as a result of the gas current curtain, the objective lateral deviation arising on the reaching of the optical system by the particle is proportional to the distance between the gas current curtain and the optical system.

The object of the invention is accordingly to provide a laser welding apparatus of the type mentioned in the introduction, which reduces the noise development of the gas current, improves its protective action and/or avoids an unfavourable influence on the welding region, without necessitating the application of an optical system having a particularly long focal length.

In a laser welding apparatus of the type mentioned in the introduction, the solution according to the invention consists in that the nozzle is provided within an injector envelope. In this arrangement, the injector envelope and the gas exhaust line can expediently form a substantially continuous flow channel, which exhibits a transverse aperture for the laser beam.

The exhaust aperture receiving the gas current opposite the nozzle can readily be dimensioned in such a manner that, having regard to the spread of the current, it receives the current in its entire cross-sectional extent, including the region of turbulence surrounding it. This measure alone brings about a considerable reduction of the reactive effects on the welding region. This effect is decisively increased by the injector envelope, which surrounds the nozzle and which forms together with the gas exhaust line a continuous flow channel, because the entire flow process takes place in a screened space. This has the consequence that the arrangement forming and surrounding the protective gas current can be disposed substantially nearer to the welding focus than was the case in the previously known arrangements, so that in the event of the application of the same optical systems a greater protective distance between the gas current curtain and the optical system can be permitted. In this arrangement, a considerable reduction of the loudness can be recorded, which is due to the fact that the region of turbulence—responsible for the production of noise—of the current is surrounded by a flow envelope, which flows in a more or less laminar pattern and which originates from the injector envelope and which is set in motion by the injector action of the arrangement and which is conveyed away with the current through the gas exhaust line.

According to the known flow laws, in the region of the current a reduced pressure is generated, which also becomes effective in the region of the transverse aperture which is intended for the passage of the laser beam. This can be disadvantageous, insofar as thereby atmospheric air and protective gas are drawn in from the surroundings of the welding region through this transverse aperture. It is indeed the case that this influencing of the welding region is substantially weaker than the turbulence effect to be observed with the previously known arrangements. However, it is frequently expedient to eliminate this also. This can take place in that the pressure in the flow channel in the region of this transverse aperture is adapted to the atmospheric pressure. Suitable means are known to the flow engineer. For example, the air can be supplied to the injector envelope surrounding the nozzle at a certain excess pressure, so that the reduced pressure generated by the injector action of the nozzle current in the region of the transverse aperture is precisely compensated. A means which is simpler and which is therefore as a rule to be preferred consists in that the current direction of the nozzle, deviating from the direction of the flow channel, has a component directed towards the laser beam exit aperture. The dynamic pressure component—associated with this direction component—of the nozzle current can, with suitable dimensioning of the deviation of the nozzle direction from the flow channel direction, compensate the pressure difference otherwise arising at the laser beam exit aperture.

Expediently, the flow channel is disposed at the end—on the object side—of the objective tube guiding the laser beam. This is possible, by virtue of the invention, in spite of the high degree of proximity, associated therewith, to the welding position, and has the advantage of a maximum distance of the gas current curtain from the optical system.

The invention is explained in greater detail hereinbelow, with reference to the drawing, which illustrates an advantageous embodiment in a longitudinal section. The tubes 1, 2 and 3 enclose a part of the optical system, in particular two mirrors 4, 5 and a protective disk 6. The tube 3 forms the exit channel for the laser beam, which tapers towards the exit aperture 7. A workpiece to be welded is indicated at the focus at 8.

Of course, the represented example of an optical system can also be designed differently, for example without mirrors and/or without a protective disk 6 with lenses.

The tube 3 is traversed at the greatest possible proximity to its exit aperture 7 on the object side by a tube 9, the axis of which is situated in a common frame with that of the tube. It forms the flow channel, in which the gas current curtain is formed according to the invention. For this purpose, there is introduced into the right hand part of the tube 9, obliquely from above, the nozzle 10, which is surrounded within the tube 9 by an annular space 11, which serves for the supply of an envelope gas current. On the left-hand side, the tube 9 forms the receiving aperture 12 and the gas exhaust line 13 for the nozzle current 14, which is indicated in broken lines and the width of which in a direction transverse to the plane of the drawing has to be presented so as to be of such a size that the entire transverse aperture formed in the tube 9 for the passage of the laser beam is screened off by it above the exit aperture 7. Particles which are thrown up from the welding position 8 and endanger the optical system traverse the current region 14 and thus receive such a strong lateral impulse that they are adequately laterally deflected over the considerable distance which lies between the current 14 and the optical system (disk 6), to become harmless.

The gas current which is set into motion by injector action of the current 14 in the tube 9 envelopes the nozzle current 14 in substantially laminar flow, and accordingly attenuates the noise development of the latter.

Moreover, the impulse exerted on the upwardly travelling particles by this gas current which is also entrained does of course contribute to the protective effect.

The reduced pressure generated by the injector action of the arrangement is compensated in the region of the exit aperture 7, in that the current 14 has a direction component directed towards the exit aperture 7 (angular deviation between the current centre of the nozzle current and the axis of the tube 9). The component of the dynamic pressure associated with this component counteracts the static reduced pressure. The inflow of atmospheric air from the surroundings of the exit aperture 7 and from the surroundings of the welding region is thereby inhibited or excluded, whereby a reactive effect on the atmosphere surrounding the welding position is also excluded.

This atmosphere is, as a rule, a protective gas, which is supplied to the welding position for example through the protective gas nozzle 15.

The arrangement has proved to be very effective, and a contribution has been made to this not only by the causes already set forth hereinabove but also by the fact that high gas velocities under conditions of relatively small current cross-sections may be achieved within the injector envelope 9.

The air supplied to the tube 9 and to the nozzle 10 can be filtered.

In a practical embodiment, an angle between the longitudinal direction of the current and the longitudinal direction of the tube 9 of between 15° and 40°, expediently approximately 30°, has given good results. At a gas pressure in the nozzle tube of 6 bar and a static pressure in the gas exhaust line of 0.6 bar, there was in this case a pressure compensation in the laser beam exit aperture 7. In this arrangement, the nozzle 10 was constructed as a flat nozzle and to cover the entire laser beam exit region. The appropriate ratio between the size of the nozzle outlet cross-section and of the cross-section of the receiving aperture proved in this case to be of the order of magnitude of 1 : 10, based on the condition that the expanded nozzle current must be received in its entirety. The receiving aperture can of course also be constructed larger, particularly in view of the size of the injector envelope surrounding the nozzle.

In the case of the application of an optical system having a focal length of 125 mm and an aperture of 20 mm, as well as a distance of the nozzle from the focus of the order of magnitude of 45 mm, it proved with such an arrangement to be possible to maintain the optical system free from dirt even after a large number of welding operations.

In alternative embodiments, it is not necessary that the injector envelope 11 formed by the tube 9 should be in alignment with the receiving aperture 12 and the gas exhaust line 3, provided that a continuous flow pattern enveloping the actual screening current 14 is achieved, with corresponding noise attenuation. Likewise, the pressure compensation in the region of the exit aperture 7 can also take place by means other than the oblique positioning of the nozzle 10, for example by superposition of an appropriate excess pressure in the injector envelope by means of a suitable fan or by a resistance to flow in the gas exhaust line 13. When, in connection with the explained example, reference is made to the optical system being made dirty, the intention is to refer to the window 6, which in other embodiments can be replaced by an appropriate lens, since the invention frequently makes the protection of the more sensitive mirrors and lenses by such a window unnecessary.

We claim:

1. Laser welding apparatus having a nozzle for generating a transversely extending gas current between the optical system and the beam focus for the deflection of particles moving in a direction towards the optical system, in which apparatus the receiving aperture of a gas exhaust line is disposed opposite the nozzle characterized in that the nozzle (10) is disposed within an injector envelope (11) and the injector envelope (11) and the gas exhaust line (13) form a substantially continuous flow channel (11, 12, 13) for the transversely extending gas flow.

2. Laser welding apparatus according to claim 1, characterized in that a pressure compensation arrangement is provided for the adaptation of the pressure in the flow channel (11, 12, 13) at the laser beam exit aperture (7) to atmospheric pressure.

3. Laser welding apparatus according to one of claims 2 or 1, characterized in that the flow channel (11, 12, 13) is disposed at the end—on the object side—of the objective tube (3).

4. Laser welding apparatus having a nozzle for generating a transversely extending gas current between the optical system and the beam focus for the deflection of particles moving in a direction towards the optical system, in which apparatus the receiving aperture of a gas exhaust line is disposed opposite the nozzle, characterized in that the nozzle (10) is disposed within an injector envelop (11), a pressure compensation arrangement is provided for the adaptation of the pressure in the flow channel (11, 12, 13) at the Laser beam exit aperture (7) to the atmospheric pressure, and the nozzle is positioned whereby the current direction of the nozzle (10), deviating from the direction of the flow channel (11, 12, 13) has a component directed towards the Laser beam exit aperture (7).

5. Laser welding apparatus according to claim 4, characterized in that the injector envelope (11) and the gas exhaust line (13) form a substantially continuous flow channel, which exhibits a transverse aperture (7) for the Laser beam.

6. The laser welding apparatus according to either of claims 4 or 5 characterized in that the flow channel is disposed at the end of—on the object side—of the objective tube.

* * * * *

UNITED STATES PATENT AND TRADEMARK OFFICE
CERTIFICATE OF CORRECTION

PATENT NO. : 4,723,063

DATED : February 2, 1988

INVENTOR(S) : Karl-Heinz Armier, Bernd Ladiges, Wolf-Dieter Scharfe

It is certified that error appears in the above-identified patent and that said Letters Patent is hereby corrected as shown below:

Title page at [75] Inventors: "Karl-Heinz Armier; Bernd Ladiges, both of Hamburg, Fed. Rep. of Germany" Should read -- Karl-Heinz Armier, Hamburg; Bernd Ladiges, Hamburg; Wolf-Dieter Scharfe, Wedel, Federal Republic of Germany --

Signed and Sealed this

Twenty-first Day of June, 1988

Attest:

DONALD J. QUIGG

Attesting Officer

Commissioner of Patents and Trademarks